(12) United States Patent
Nirantare

(10) Patent No.: US 12,166,345 B2
(45) Date of Patent: Dec. 10, 2024

(54) SYSTEMS AND METHODS FOR A HYBRID POWER GRID

(71) Applicant: Cummins Power Generation Inc., Minneapolis, MN (US)

(72) Inventor: Prasanna S. Nirantare, Maharashtra (IN)

(73) Assignee: Cummins Power Generation Inc., Minneapolis, MN (US)

( * ) Notice: Subject to any disclaimer, the term of this patent is extended or adjusted under 35 U.S.C. 154(b) by 16 days.

(21) Appl. No.: 17/470,542

(22) Filed: Sep. 9, 2021

(65) Prior Publication Data

US 2022/0085604 A1    Mar. 17, 2022

Related U.S. Application Data

(60) Provisional application No. 63/077,106, filed on Sep. 11, 2020.

(51) Int. Cl.
*G05B 13/02* (2006.01)
*H02J 3/00* (2006.01)
*H02P 9/10* (2006.01)
*H02J 3/38* (2006.01)

(52) U.S. Cl.
CPC ............ *H02J 3/001* (2020.01); *G05B 13/024* (2013.01); *H02P 9/107* (2013.01); *H02J 3/381* (2013.01); *H02J 2300/24* (2020.01)

(58) Field of Classification Search
None
See application file for complete search history.

(56) References Cited

U.S. PATENT DOCUMENTS

| | | | |
|---|---|---|---|
| 7,702,424 B2* | 4/2010 | Cannon | H04L 12/10 700/24 |
| 7,920,942 B2* | 4/2011 | Lasseter | H02J 3/381 323/212 |
| 8,159,178 B2 | 4/2012 | Serban | |
| 8,228,697 B2* | 7/2012 | Wagoner | H02J 3/381 363/35 |

(Continued)

FOREIGN PATENT DOCUMENTS

WO    WO-2015/102598 A1    7/2015

OTHER PUBLICATIONS

Tayab et al., "A review of droop control techniques for microgrid", Elsevier, Renewable and sustainable Energy Reviews, pp. 717-727 (Year: 2017).*

(Continued)

*Primary Examiner* — Jason Lin
(74) *Attorney, Agent, or Firm* — Foley & Lardner LLP

(57) ABSTRACT

Systems and methods for managing power on supplied to a load are provided. In some embodiments, a hybrid power system includes a generator and a power source having an inverter connected to one or more loads. The generator may have a controller that is configured to adjust a parameter (e.g., frequency) of electrical power output via the generator based on a current magnitude of electrical power output of the generator. The inverter is configured to detect the parameter of the electrical power supplied to the load and to adjust a magnitude of current electrical power output based on the detected parameter.

20 Claims, 5 Drawing Sheets

(56) References Cited

U.S. PATENT DOCUMENTS

| | | | | |
|---|---|---|---|---|
| 8,259,479 B2* | 9/2012 | Wagoner | .................. | H02J 3/38 |
| | | | | 363/131 |
| 10,840,708 B2* | 11/2020 | Dobrowolski | .......... | H02J 3/381 |
| 11,418,039 B2* | 8/2022 | Olivo | ........................ | H02J 3/46 |
| 2007/0040540 A1* | 2/2007 | Cutler | .................... | H02J 3/381 |
| | | | | 323/283 |
| 2007/0246943 A1* | 10/2007 | Chang | ....................... | F03D 9/11 |
| | | | | 290/44 |
| 2008/0106921 A1* | 5/2008 | Dickerson | ................. | H02J 7/35 |
| | | | | 363/131 |
| 2008/0290252 A1* | 11/2008 | Leonhardt | ................. | G05F 1/67 |
| | | | | 250/203.4 |
| 2009/0103340 A1* | 4/2009 | Bremicker | ............. | H02M 7/515 |
| | | | | 363/123 |
| 2009/0326724 A1* | 12/2009 | Lasseter | .................. | H02J 3/381 |
| | | | | 700/297 |
| 2011/0043160 A1 | 2/2011 | Serban | | |
| 2011/0210614 A1* | 9/2011 | Min | ......................... | H02J 3/32 |
| | | | | 307/82 |
| 2012/0083939 A1* | 4/2012 | Rognli | .............. | H02J 13/00004 |
| | | | | 700/297 |
| 2012/0175876 A1* | 7/2012 | Pendray | .................. | F02D 29/06 |
| | | | | 290/41 |
| 2012/0212066 A1* | 8/2012 | Adest | ...................... | H02M 7/44 |
| | | | | 307/82 |
| 2012/0299386 A1* | 11/2012 | Kaufman | ................ | H02J 3/388 |
| | | | | 323/311 |
| 2013/0274947 A1* | 10/2013 | Miller | ................ | G05B 19/0428 |
| | | | | 700/297 |
| 2014/0097683 A1* | 4/2014 | Piyabongkarn | ........... | H02J 3/32 |
| | | | | 307/26 |
| 2015/0137520 A1* | 5/2015 | Garcia | .................... | F03D 9/255 |
| | | | | 290/44 |
| 2016/0329713 A1* | 11/2016 | Berard | .................... | H02M 5/04 |
| 2017/0194792 A1* | 7/2017 | Zimmanck | ........ | H02J 13/00007 |

OTHER PUBLICATIONS

Sun et al., "New Perspectives on Droop Control in AC microgrid", IEEE transactions on industrial electronics, vol. 64, No. 7, pp. 5741-5745 (Year: 2017).*

* cited by examiner

SYSTEMS AND METHODS FOR A HYBRID POWER GRID

CROSS REFERENCE TO RELATED APPLICATIONS

This application claims priority to and the benefit of U.S. Provisional Patent Application No. 63/077,106, filed Sep. 11, 2020, the entire disclosure of which is hereby incorporated herein by reference.

TECHNICAL FIELD

The present disclosure relates generally to electric power transmission. More particularly, the present disclosure relates to systems and methods for controlling power on a power grid.

BACKGROUND

On a power or utility grid, there may be one or more sources of energy (e.g., generators, wind turbines, gas turbines, steam turbines, solar panels, etc.) that are designed to supply energy to one or more loads. For example, a grid (e.g., micro-grid) may include two or more generators in parallel with one or more solar inverters that are configured to supply power to one or more loads. In some applications, for example when the load on the grid is low, the solar inverter may supply an amount of power that is greater than the load causing inefficiencies, damage to the one or more generators, or a fault on the one or more generators.

SUMMARY

One implementation is related to a system, the system includes a genset (e.g., generator) that is configured to output electrical power to a load. In some embodiments, the load may include a disconnected load, one or more loads, a local grid having one or more loads, or a micro-grid having one or more loads. The genset includes a controller that is configured to control a parameter (e.g., frequency) of the electrical power output by the genset based on a magnitude of current electrical power output of the genset. The system also includes a power source (e.g., a photovoltaic array, energy storage system, wind turbine, etc.) that is configured to output electrical power to the grid or the load. The power source includes an inverter that is configured to detect the parameter of the electrical power on the grid and control or adjust a magnitude of electrical power output via the inverter based on the detected parameter.

In some embodiments, to control the parameter, the controller is configured to set the frequency of the electrical power output by the genset based on a function of a magnitude of power output of the genset. The controller may be configured to increase the frequency as the magnitude of power output of the genset falls below a threshold. Further, the inverter may be configured adjust an amount of power output from the power source to the power grid or load based the frequency (e.g., detected frequency). In some embodiments, the inverter is configured to output a maximum amount of power from the power source to the power grid or load when the frequency is at a first set point. The inverter may be configured to reduce the amount of power output from the power source to the power grid or load when the frequency increases from the first set point.

Additionally or alternatively, the controller may configured to adjust the parameter of the electrical power based on a hysteresis curve relating the parameter to a percentage of the magnitude of the current output relative to a total power capacity of the genset. In some embodiments, the controller is configured to adjust the parameter from a first set point toward a second set point when the magnitude of the current electrical power output falls below a minimum threshold.

Another implementation is related to a generator that is configured to output electrical power to a load. The generator includes a controller that is configured to determine a magnitude of current electrical power output of the generator and adjust a parameter of electrical power output by the generator based on the magnitude of the current electrical power output. In some embodiments, the parameter comprises a frequency of the electrical power output. The adjustment of the parameter of the electrical power output by the generator may be configured to signal to other devices connected to the power grid to adjust respective magnitudes of current electrical power output. In some embodiments, an increase in frequency of the electrical power output by the generator is configured to signal to one or more inverters to lower respective magnitudes of current electrical power output. In some embodiments, the maximum frequency of the electrical power output by the generator is configured to signal to one or more inverters to stop outputting electrical power. Further, the controller may adjust the parameter based on a hysteresis curve.

Another implementation is related to a method of managing power on a power grid. The method includes adjusting, via a first device, a parameter of electrical power output via the first device to a power grid based on a magnitude of current electrical power output of the first device, detecting, via a second device, the parameter of electrical power on the power grid, and in response to detecting the parameter, adjusting a magnitude of power supplied via the second device to the power grid. The parameter of electrical power may include a frequency of the electrical power. In some embodiments, adjusting the amount of power supplied via the second device comprises adjusting the amount of power supplied via the second device based on a function of the parameter. The second device may output a maximum amount of power when the parameter is at a set point, and reduce the power output as the parameter increases from the set point.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
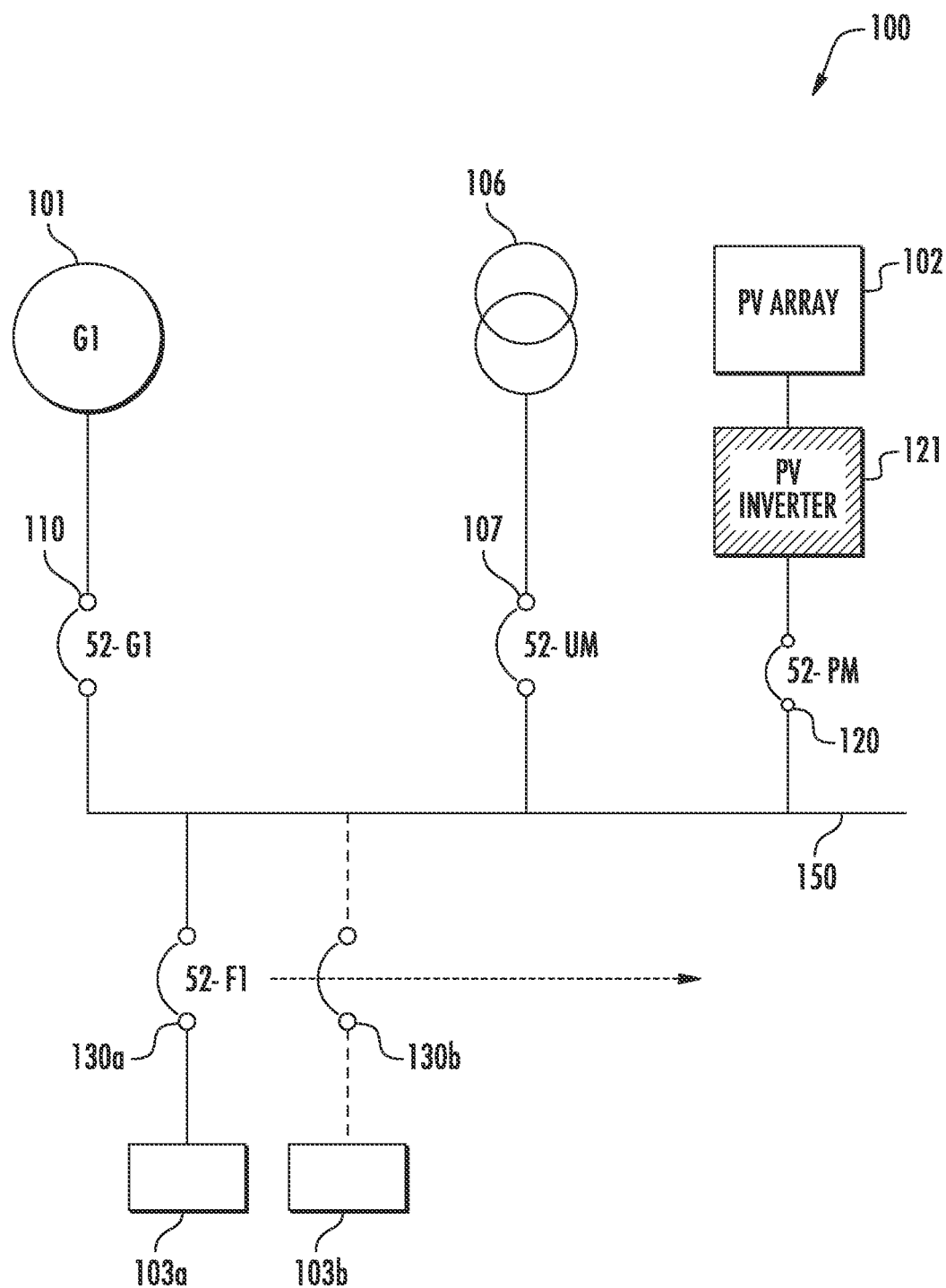
FIG. 1 is a schematic diagram illustrating a hybrid power grid according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods for power control is provided according to exemplary embodiments. A power control system includes one or more energy sources that are connected to and configured to supply power to one or more loads. In some embodiments, the one or more energy sources are connected in parallel such that the respective output terminals of the energy sources share a common bus (e.g., or common node). In some embodiments, the respective output terminals of the energy sources may be connected to the common bus via a circuit breaker, fuse, or other contact that may be used to electrically connect or disconnect the respective generator from the common bus. Each of the one or more loads may be connected to the common bus via a respective device (e.g., circuit breaker, fuse) that is wired in series between the terminals of the load and the common bus.

In some embodiments, a first energy source (e.g., first device) is a generator. In some embodiments, a second energy source (e.g., second device) is a photovoltaic (PV) array connected to the grid via an inverter. In some embodiments, a third energy source (e.g., third device) may be a wind turbine or wind farm connected to the grid via a second inverter. The generator is configured to adjust an operating set point of a parameter (e.g., frequency or voltage) of the electrical power output to the grid based on the percentage of power that the generator is outputting relative to a total power capacity of the generator. The inverter is configured to monitor the parameter (e.g., frequency) of the electrical power on the grid and adjust a power output of the inverter based on the monitored or detected parameter (e.g., frequency). In this way, the generator is able to indicate or signal to the inverters to adjust a magnitude of power output that the inverters should be outputting without a communications network. Accordingly, the power output controls of the generator and inverters allow for a hybrid power grid (e.g., a power grid that includes generators, renewable power sources, and/or other energy systems that use inverters) that can be seamlessly integrated without the need for a communications network, a supervisory controller, or a communication cables between the energy sources, which results in less expense and more efficient deployment. Moreover, the power output controls of the generator and inverters ensure that the inverters curtail respective power outputs when the generator is approaching, at, or below a minimum power threshold, which ensures that the generators do not receive a reverse power flow that may cause damage to the generators or the generators to fault and/or disconnect from the power grid.

Referring to FIG. 1, a schematic diagram illustrating a power grid 100 (e.g., hybrid power grid) is shown according to an exemplary embodiment. The power grid 100 includes a generator 101 connected to a common bus 150 via a first circuit breaker 110 and a power source 102 (e.g., a renewable energy power source) connected to the common bus 150 via an inverter 121 and a second circuit breaker 120. In some embodiments, other gensets or power sources 106 (e.g., mains power supply) may also be selectively connected to the common bus 150 via a circuit breaker 107. It is to be appreciated that FIG. 1 is meant to be only one example of a hybrid power grid. In other examples, the power grid 100 may include two, three, four, or more generators and two, three, four, or more renewable power sources with respective hardware (e.g., circuit breakers).

Moreover, in yet other examples, the power grid 100 may include one or more energy storage systems (ESS) or other energy sources connected to the common bus via an inverter and/or circuit breakers.

The power grid 100 may also include a first load 103a connected to the common bus 150 via a third circuit breaker 130a and/or a second load 103b connected to the common bus 150 via a fourth circuit breaker 130b. In some embodiments, the grid may have two, three, four, five or more loads connected to the common bus 150.

The generator 101 and inverter 121 may have a controller. The controller may include a processor, a memory, and/or an input output interface. The controller is configured to control the operation of the respective device (e.g., generator or inverter). The memory may be any sort of non-transitory machine-readable storage medium including machine readable instructions that, when executed by the processor, cause the processor to perform, assist in performing, or otherwise implement the operations and methods described herein. In some embodiments, the input/output interface may allow the controller to communicate with other electronic devices (e.g., a personal computer, a server system, sensors, etc.). In some embodiments, the input/output interface may allow for an interface or connection between the processor and one or more sensors such that the controller can monitor or detect electrical parameters of electrical power on the common bus or operating states of the respective device. The controller is configured to operate, execute, or assist in performing a power output control algorithm. The power output control algorithm of the generator is configured to adjust the frequency set point of the electrical power output by the generator based on an amount (e.g., or a magnitude) of power output of the generator. The power output control algorithm of the inverter is configured to adjust an amount (e.g., or magnitude) of power output via the inverter based on the frequency detected of the electrical power on the gird.

Figure 2:
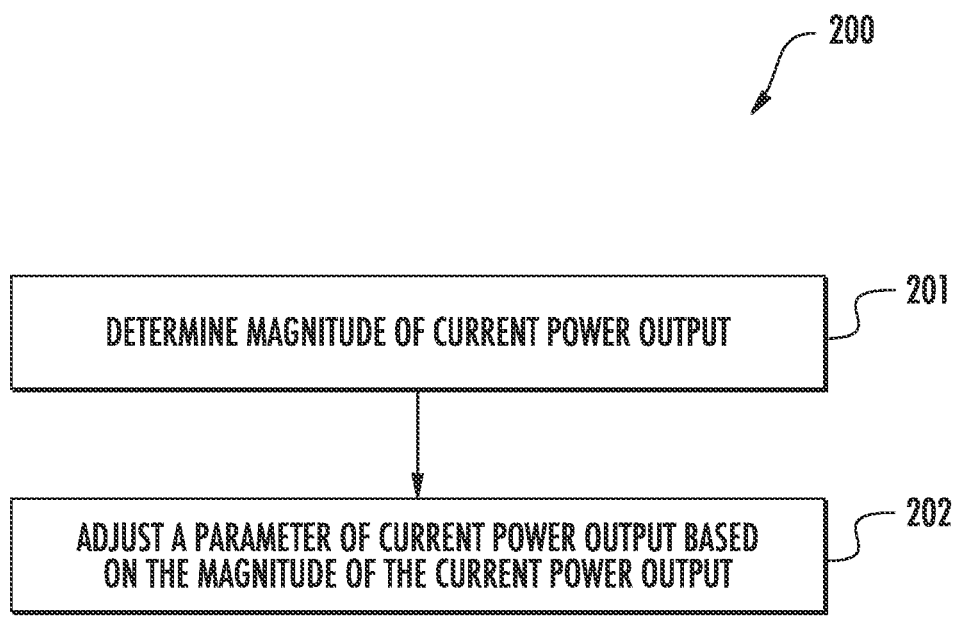
FIG. 2 is a flow diagram of a power output control algorithm for a generator according to an exemplary embodiment.
Figure 3:
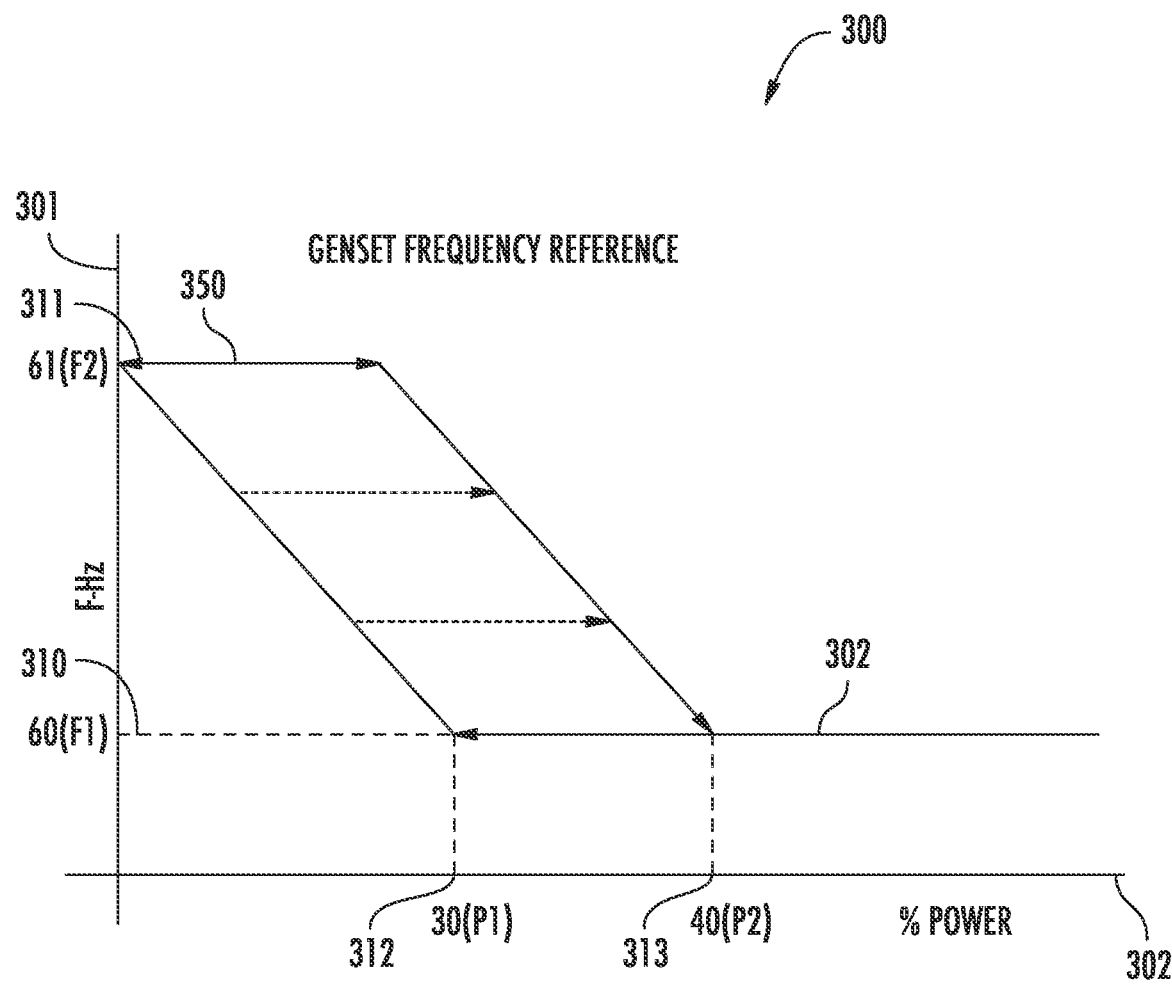
FIG. 3 is a graph of frequency set points relative to current electrical power output of a generator according to an exemplary embodiment.

FIG. 2 and FIG. 3 are generally directed to a power output control algorithm of a generator and are discussed in tandem for purposes of demonstration. FIG. 2 depicts a flow diagram 200 of a power output control algorithm for a generator according to an exemplary embodiment. FIG. 3 depicts a graph 300 of frequency set points relative to current electrical power output of a generator according to an exemplary embodiment.

At an operation 201, the generator determines a magnitude of current electrical power being output to the grid. The generator may determine the magnitude of current electrical power output as a percentage of the total power capacity of the generator. For example, a controller of the generator may be configured to determine, detect (e.g., via one or more sensors), and/or calculate the magnitude of the current electrical power being output to the grid and/or calculate the percentage of current electrical power output relative to the total power capacity that the generator is rated for. In some embodiments, the total power capacity of the generator may be stored within the memory of the controller and assessable by the processor for a determination or calculation.

At an operation 202, the generator adjusts a frequency of the current electrical power being output to the grid based on the magnitude of the current electrical power. For example, the controller may have a function stored in memory that is accessible to the processor such that the processor can access the function and determine the frequency at which the current electrical power should be output to the grid. The function may relate the frequency at which the current electrical power should be output to the grid relative to the magnitude of current electrical power of the generator (e.g., or to the percentage of the current electrical power relative to total power capacity of the generator). In some embodiments, the function is a linear function. In some embodiments, the function is a non-linear function. In some embodiments, the function is based on hysteresis curve. For example, FIG. 3 depicts a graph 300 of a hysteresis curve that the controller of the generator may store and use as a reference to determine and adjust the frequency of the current electrical power output by the generator based on the magnitude of the current electrical power output or a percentage thereof relative to the total power capacity of the generator.

The graph 300 includes a y-axis 301 that represents the frequency that the generator (e.g., via the controller) should be outputting electrical power at and an x-axis 302 that represents the percentage of the magnitude of current electrical power relative to the total power capacity. The graph 300 also includes a hysteresis curve 305. The graph 300 also includes a first frequency set point 310 (e.g., F1), a second frequency set point 311 (e.g., F2), a first power percentage set point 312 (P1), and a second percentage set point 313 (P2). The set points 310, 311, 312, and 313 may be configured, set, or adjusted within the controller either manually or automatically based on the application in which the generator is being deployed. For example, in some embodiments, it may be desirable to keep a particular generator above a minimum power output of 30% and the set points may be adjusted in order to ensure that the generator can maintain the minimum power output. As another example, the first frequency set point 310 (F1) may be set at a nominal frequency set point of a particular grid that the generator is being deployed in (e.g., 60 Hz) and the second frequency set point 311 (F2) may be set at a value that ensures that no damage will be caused to the loads when the generator outputs a frequency at the second frequency (e.g., 61 Hz).

As an example, when the generator is outputting a power percentage (e.g., the magnitude of current electrical power output divided by the total power capacity) greater than the second percentage set point 313 (P2), then the frequency of the current electrical power is set to be the first frequency set point 310 (F1). Further, once the power percentage drops below the first percentage set point 312 (P1), the generator begins to linearly adjust the frequency of the current electrical power toward the second frequency set point 311 (F2). The hysteresis curve prevents the generator prevents oscillation of current electrical power output adjustments between the generator and the inverters. For example, the generator will not begin to adjust the frequency of the current electrical power back toward the first frequency set point 310 (F1) until the power percentage increases enough to cross a hysteresis band 350. Once the power percentage increases past the second percentage set point 313 (P2), the generator will again output a frequency of current electrical power at the first frequency set point 310 (F1). The hysteresis band 350 is defined by the function (e.g., linear in the example of FIG. 3) between the first percentage set point 312 (P1) and the first frequency set point 310 (F1) and the function (e.g., linear in the example of FIG. 3) between the second frequency set point 311 (F2) and the second percentage set point (P2).

Figure 4:
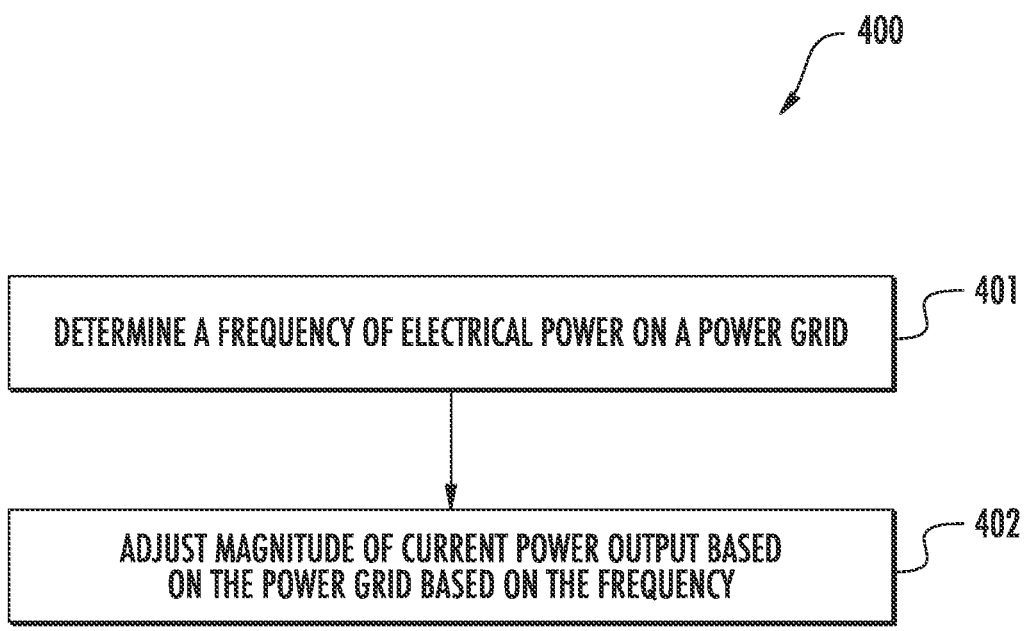
FIG. 4 depicts a flow diagram of a power output control algorithm for an inverter according to an exemplary embodiment.
Figure 5:
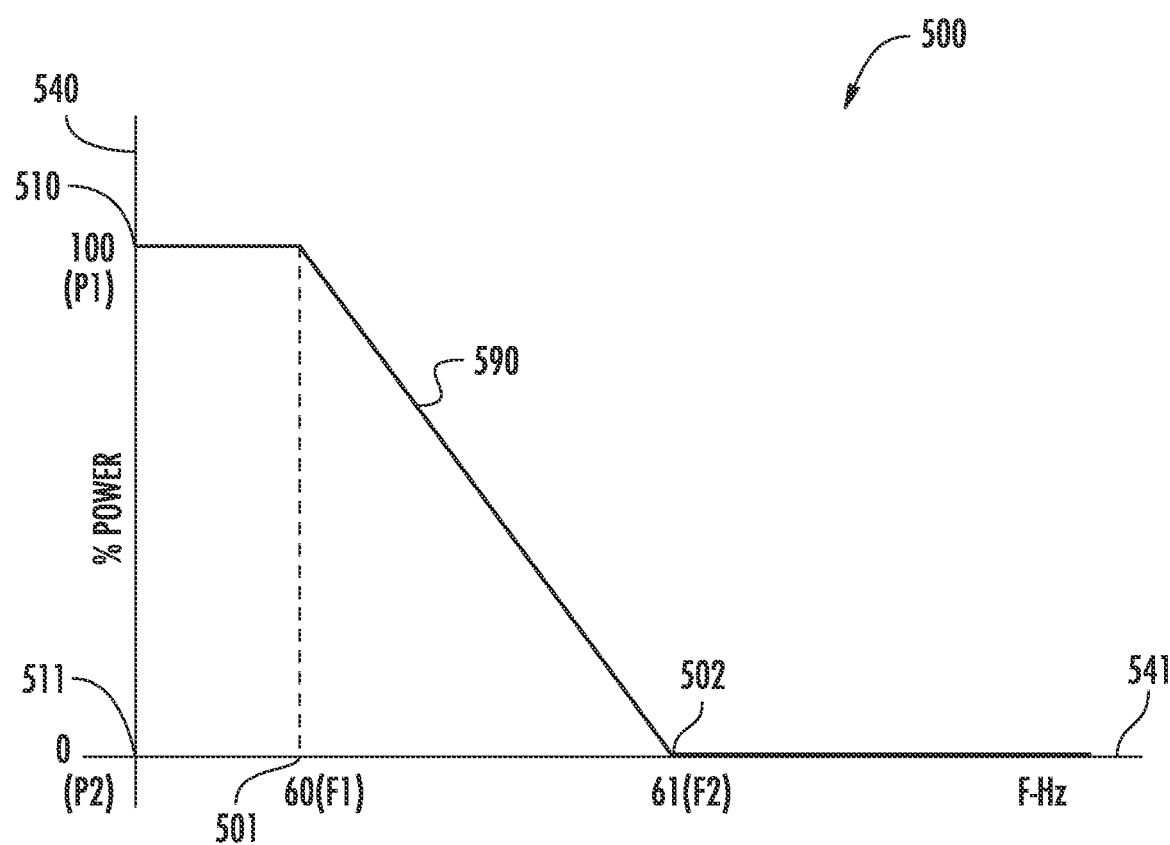
FIG. 5 is a graph of current electrical power output relative to frequency according to an exemplary embodiment.

FIG. 4 and FIG. 5 are generally directed to a power output control algorithm of an inverter and are discussed in tandem for purposes of demonstration. FIG. 4 depicts a flow diagram 400 of a power output control algorithm for an inverter according to an exemplary embodiment. FIG. 5 depicts a graph 500 of current electrical power output relative to frequency according to an exemplary embodiment.

At an operation 401, the inverter determines the frequency of the electrical power on the grid. For example, a controller of the inverter may be communicably coupled to one or more sensors that are configured to detect the frequency and/or other electrical power parameters of power on the grid (e.g., or on common bus). In some embodiments, the controller may be configured to periodically update or re-determine the frequency of the electrical power on the grid. In some embodiments, the controller may be configured to store the determined or detected frequency with the memory. The inverter may monitor the electrical parameters of electrical power on the grid via monitoring the electrical power at an output terminal of the inverter.

At an operation 402, the inverter adjusts a magnitude of current electrical power output from the inverter to the grid based on the frequency of the electrical power on the power grid. For example, the inverter may have a function stored in memory that is assessable via the processor in order for the processor to determine the magnitude of current electrical power output that the inverter should be outputting based on the detected or determined frequency. The function relates a current electrical power output that the inverter should be outputting relative to the detected or determined frequency. In some embodiments, the function may be linear or non-linear depending on the type of power sources that the inverter is receiving power from or the configuration of the power grid. In some embodiments, the function may be manually stored and/or updated within the memory of the controller. For example, FIG. 5 depicts a graph 500 of a function 590 that the controller of the inverter may store and use as a reference to determine and adjust the current electrical power output of the inverter based on the detected frequency of electrical power on the grid.

The graph 500 includes a y-axis 540 that represents a percentage of power that the inverter should be outputting relative to a total capacity of power output of the inverter and power source and an x-axis 541 that represents a frequency of the electrical power on the grid. The graph 500 also includes a first frequency set point 501 (F1) and a second frequency set point (F2). In some embodiments, the first frequency set point 501 (F1) may be set to be the same value of the first frequency set point 310 (F1) as described in reference to FIG. 3 and the second frequency set point 502 (F2) may be set to be the same value of the second frequency set point 311 (F2) as described in reference to FIG. 3. Additionally, the graph 500 includes a first power output percentage set point 510 (e.g., P1 or 100%) and a second power output percentage point 511 (e.g., P2 or 0%). The set points 501, 502, 510, and 511 may be manually set or updated within a memory of the controller of the inverter.

As an example, when the inverter determines or detects that the frequency of the electrical power on the grid is at or above the second frequency set point 502 (F2), the inverter then outputs no electrical power to the grid (e.g., 0% of current electrical power output relative to the total capacity). Further, once the inverter determines or detects that the frequency of the electrical power is below or falling below the second frequency set point 502, the inverter begins to increase (e.g., in this example, linearly) the percentage of power output toward the first power output percentage point 510 (P1). Additionally, if the inverter determines or detects that the frequency of the electrical power on the grid is below the first frequency set point 501 (F1), the inverter outputs a magnitude of current electrical power that is represented as the first power output percentage point 510 (e.g., 100% or a maximum amount of total power capacity of the inverter). In this way, the inverter can adjust a respective magnitude of current electrical power output based on the detected or determined frequency such that the generator (e.g., or generators) can maintain a minimum power output and/or ensure that the generators do not have a reverse power flow due to the inverter (e.g., or inverters), which increases the efficiency and reliability of the grid (e.g., the hybrid power grid) without the need of a communications network or supervisory controller to control the power output of the inverters.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a computer or other machine with a processor. Combinations of the above are also included within the scope of machine-readable storage media. Machine-executable instructions include, for example, instructions and data which cause a computing device or machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a computing device that includes, for example, a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A system comprising:
a genset configured to output electrical power to a load associated with a local power grid, the genset comprising:
a controller configured to adjust a first parameter of the electrical power output by the genset based on a magnitude of current electrical power output of the genset, wherein the controller is configured to adjust the first parameter of the electrical power output based on a relationship between the magnitude of current electrical power output of the genset and a total power capacity of the genset; and
a power source configured to output electrical power to the load, the power source comprising:
an inverter configured to:
detect a second parameter of the electrical power on the local power grid; and
control a magnitude of the electrical power output by the power source via the inverter based on the second parameter.

2. The system of claim 1, wherein the first parameter of the electrical power output by the genset comprises a frequency of the electrical power output by the genset, and the second parameter of the electrical power on the local power grid comprises a frequency of the electrical power on the local power grid.

3. The system of claim 2, wherein to control the first parameter, the controller is configured to set the frequency of the electrical power output by the genset based on a function of the magnitude of the electrical power output of the genset.

4. The system of claim 3, wherein the controller is configured to increase the frequency as the magnitude of the electrical power output of the genset falls below a threshold.

5. The system of claim 2, wherein the inverter is configured to adjust an amount of the electrical power output from the power source to the load based on the frequency.

6. The system of claim 5, wherein the inverter is configured to output a maximum amount of the electrical power output from the power source to the load when the frequency is at a first set point.

7. The system of claim 5, wherein the inverter is configured to reduce the amount of the electrical power output from the power source to the load when the frequency increases from a first set point.

8. The system of claim 1, wherein the inverter is configured to control the magnitude of the electrical power output from the power source via the inverter based on a linear function of the first parameter.

9. The system of claim 1, wherein the controller is configured to adjust the first parameter of the electrical power based on a hysteresis curve relating the first parameter to a percentage of the magnitude of the current electrical power output relative to the total power capacity of the genset.

10. The system of claim 9, wherein the controller is configured to adjust the first parameter from a first set point toward a second set point when the magnitude of the current electrical power output falls below a minimum threshold.

11. A generator configured to output electrical power to a load associated with a local power grid, the generator comprising:
a controller configured to:
determine a magnitude of current electrical power output of the generator; and
adjust a frequency of electrical power output by the generator based on a portion of the magnitude of the current electrical power output of the generator relative to a total power capacity of the generator, wherein the controller is configured to adjust a parameter of the electrical power output based on a relationship between the magnitude of the current electrical power output of the generator to the total power capacity of the generator.

12. The generator of claim 11, wherein to adjust the frequency of the electrical power output, the controller is further configured to increase the frequency beyond a nominal set point in response to determining that the magnitude of the current electrical power output of the generator is below a threshold.

13. The generator of claim 12, wherein adjusting the frequency of the electrical power output by the generator is configured to signal to other devices connected to the load to adjust respective magnitudes of current electrical power output.

14. The generator of claim 12, wherein an increase in frequency of the electrical power output by the generator is configured to signal to one or more inverters to lower respective magnitudes of current electrical power output.

15. The generator of claim 14, wherein the increase in frequency to a maximum frequency of the electrical power output by the generator is configured to signal to the one or more inverters to stop outputting electrical power.

16. The generator of claim 11, wherein the controller adjusts the frequency based on a hysteresis curve.

17. A method of managing power on a local power grid comprising:
adjusting, via a first device, a frequency of electrical power output via the first device to the local power grid based on a magnitude of current electrical power output of the first device, wherein a controller is configured to adjust a first parameter of the electrical power output based on a relationship between the magnitude of current electrical power output of the first device and a total power capacity of the first device;
detecting, via a second device, a second parameter of electrical power on the local power grid; and
in response to detecting the second parameter, adjusting a magnitude of electrical power supplied via the second device to the local power grid.

18. The method of claim 17, wherein the second parameter of the electrical power on the local power grid comprises a frequency of the electrical power on the local power grid.

19. The method of claim 17, wherein adjusting the amount of the electrical power supplied via the second device comprises adjusting the amount of the electrical power supplied via the second device based on a function of the first parameter.

20. The method of claim 17, wherein a maximum amount of the electrical power is supplied via the second device when the second parameter is at a set point, and a reduced amount of the electrical power is supplied via the second device as the second parameter deviates from the set point.

* * * * *